United States Patent [19]
Luo

[11] Patent Number: 6,070,915
[45] Date of Patent: Jun. 6, 2000

[54] COUPLING DEVICE FOR TUBE

[76] Inventor: Chung-I Luo, 9F, No. 108, Kuan-Chian E. Rd., Pan-Chiao City, Taipei Hsien, Taiwan

[21] Appl. No.: 09/074,417

[22] Filed: May 8, 1998

[51] Int. Cl.⁷ .................................................. F16L 41/00
[52] U.S. Cl. .................................. 285/125.1; 285/130.1; 285/133.4; 285/179; 285/286.2; 285/294.4; 285/371; 285/382; 285/906; 403/268; 403/279
[58] Field of Search ........................... 285/296.1, 294.4, 285/289.2, 289.3, 125.1, 915, 130.1, 382, 133.21, 179, 370, 371, 397, 286.2, 906, 288.5, 288.6, 290.3, 290.4; 403/268, 279, 281

[56] References Cited

U.S. PATENT DOCUMENTS

| | | | |
|---|---|---|---|
| 344,760 | 6/1886 | Wilbur | 285/296.1 |
| 587,695 | 8/1897 | Billing et al. | 285/382 X |
| 1,344,221 | 6/1920 | Burns | 285/296.1 X |
| 1,995,616 | 3/1935 | Kamack | 285/289.3 |
| 2,880,021 | 3/1959 | White | 285/382 X |
| 5,890,287 | 4/1999 | Fukaya | 285/382 X |

FOREIGN PATENT DOCUMENTS

688923   3/1953   United Kingdom .......... 285/FOR 171

*Primary Examiner*—Dave W. Arola
*Attorney, Agent, or Firm*—Smith, Gambrell & Russell, LLP

[57] ABSTRACT

The present invention relates to an improved coupling device for tube and that is configured with a tube and an insert that can be fixedly disposed within the tube. The insert includes at least an enlarged portion that has an annular groove thereof, and a receiving space. The tube is provided with a plurality of through holes at the middle portion or end portions. The insert can be disposed within the tube and the outer of the tube is machined to form an annular recess corresponding to the annular groove in a manner such that the insert is fixedly disposed within the tube. Wherein each of the two tubes is provided with an insert in the position to be connected, and the tubes is arranged side-by-side at the area to be connected. An enclosing element is deployed to the connecting area such that the tubes are fixedly connected.

5 Claims, 8 Drawing Sheets

COUPLING DEVICE FOR TUBE

FIELD OF THE INVENTION

The present invention relates to a coupling device, more particularly, to a coupling device for tubes to be assembled with each other. The tubes can be undergone a heat treatment prior they are connected. The deformation during the welding can be therefore eliminated.

DESCRIPTION OF PRIOR ART

Figure 8:
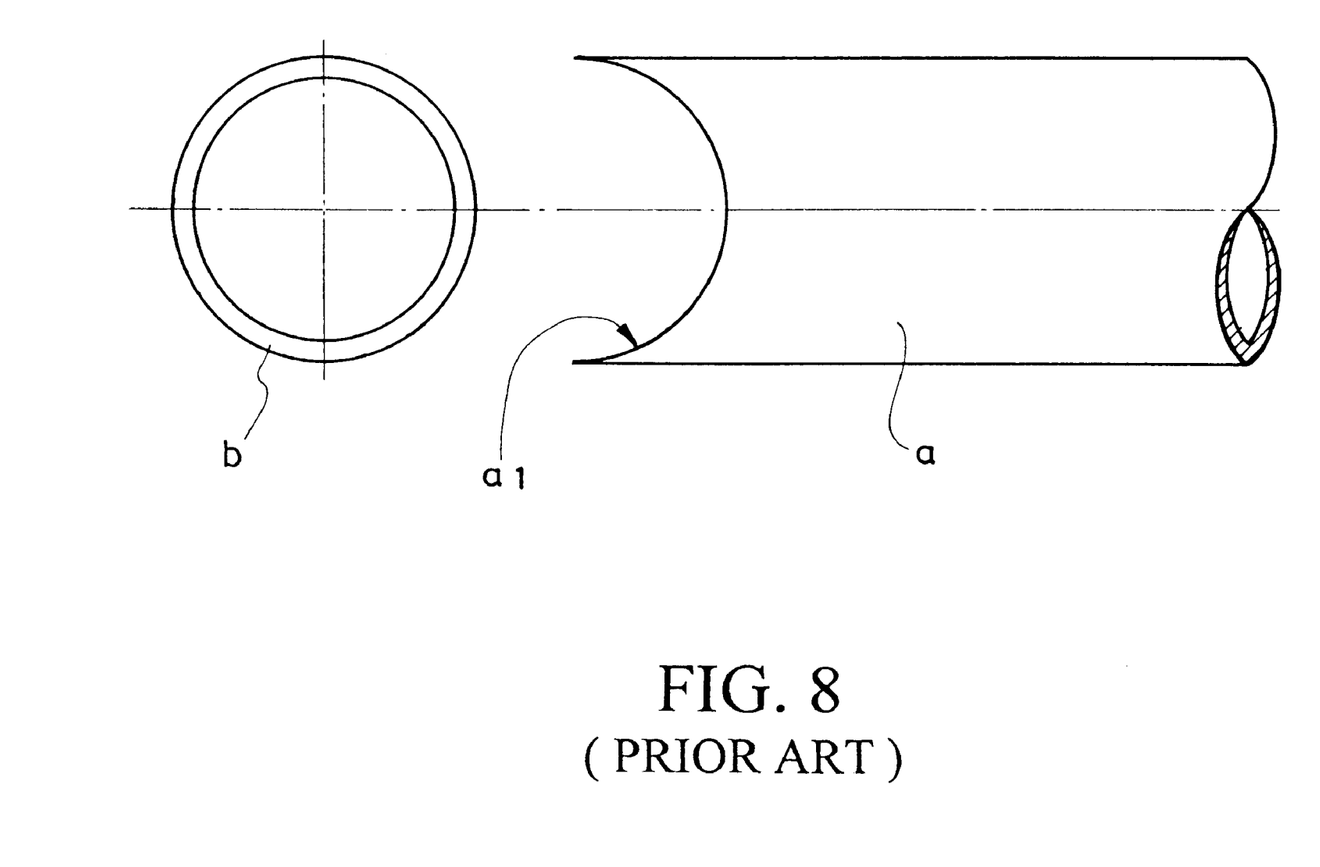
FIG. 8 is an exploded view of conventional connecting arrangement between two tubes.
Figure 9:
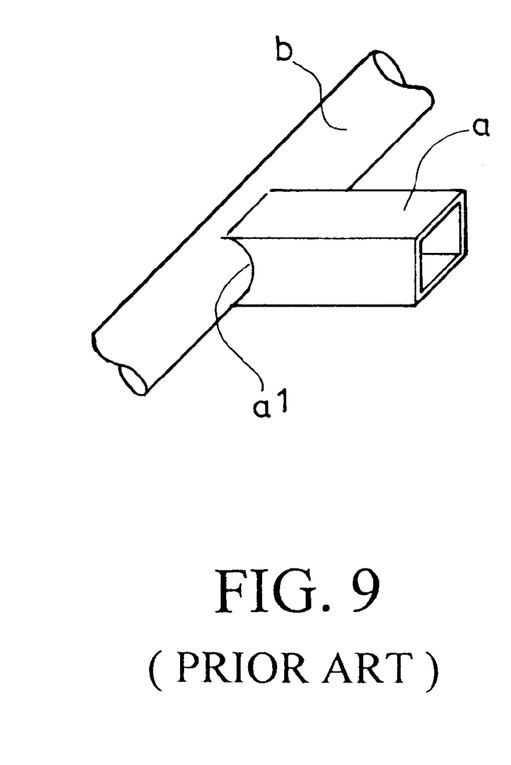
FIG. 9 is a perspective view of two tubes that are conventionally connected in T-shape arrangement.

As shown in FIGS. 8 and 9, in connecting two tubes that are arranged in T-shape arrangement, the first tube (a) shall be cut with a cutout (a1) in the area to be connected. Then the cutout (a1) of the first tube (a) is rested onto the second tube (b). Then a welding process will be performed along the joint between the outer wall of the second tube (b) and the cutout (a1) of the first tube (a).

Figure 10:
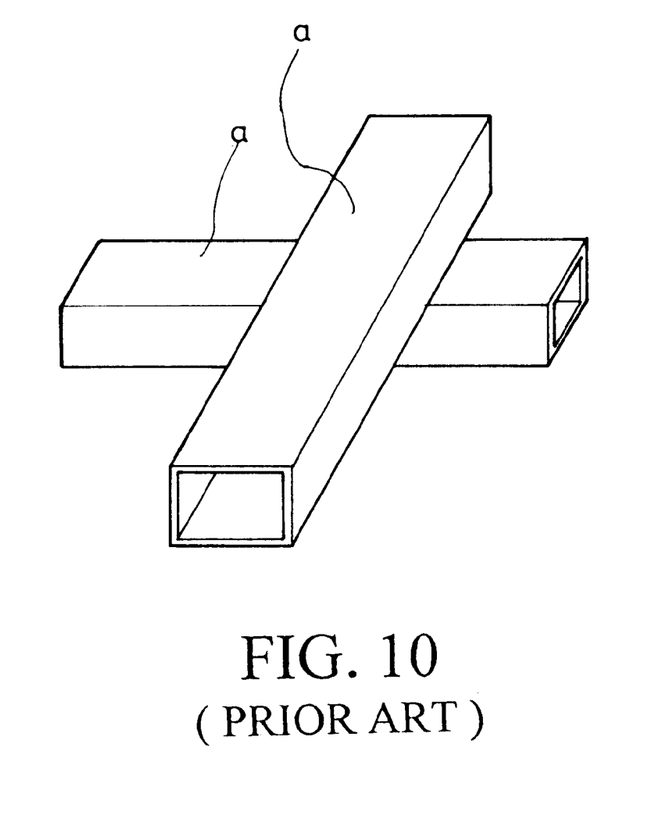
FIG. 10 is a perspective view of two tubes that are conventionally connected in X-arrangement.

As shown in FIG. 10, the first and second tubes (a, b) are connected in X-shape arrangement. In this case, even no need of cut a cutout on both the first and second tubes (a, b), the rigidity and strength on the welding area will be weakened. In order to ensure the rigidity and strength of the overall structure, the tube assembly shall be undergone a heat treatment to increase the rigidity and strength in the welding area in a manner such that the welding area has an equal rigidity and strength with the first and second tubes (a, b).

However, the assembly has a bulk size after the tubes are connected with each other. Furthermore, the overall configuration becomes also complicate. It will be difficult to get a homogeneous heating to each and every tube of the assembly. Both the heating and cooling of the assembly can not be simultaneously reached. In light of this, the heat treatment becomes more and more difficult. Not only will increase the cost of the heat treatment, but will also be difficult to get a homogeneous heat treatment effect. The cost increase tremendously as the overall structure becomes complicate. No doubt the overall cost will be increased.

While the bulk size of the assembly increases, the heating chamber becomes larger and larger. This will also lower the throughput of the heating chamber as a limited number of assemblies can be heated and cooled within the heating chamber. The manufacturing cost will be increased as well.

There is another problem encountered by the prior art. The tubes will experience a first deformation after the welding. A second deformation will be encountered after the heat treatment. Those two deformations will negatively influence the aesthetic appearance and outer dimension of assembly or work.

SUMMARY OF THE INVENTION

It is the objective of this invention to provide an improved coupling device wherein the tube can be undergone a heat treatment before the tube is connected.

It is still the objective of this invention to provide an improved coupling device wherein the manufacturing cost can be lowered.

It is yet still the objective of this invention to provide an improved coupling device wherein the deformation of the tube can be completely eliminated.

In order to achieve the objective set forth, an improved coupling device for tube is provided. The coupling device is configured with a tube and an insert that can-be fixedly disposed within the tube. The insert includes at least an enlarged portion that has an annular groove thereof, and a receiving space. The tube is provided with a plurality of through holes at the middle portion or end portions. The insert can be disposed within the tube and the outer of the tube is machined to form an annular recess corresponding to the annular groove in a manner such that the insert is fixedly disposed within the tube. Wherein each of the two tubes is provided with an insert in the position to be connected, and the tubes is arranged side-by-side at the area to be connected. An enclosing element is deployed to the connecting area such that the tubes are fixedly connected.

DETAILED DESCRIPTION OF PREFERRED EMBODIMENT

Figure 1:
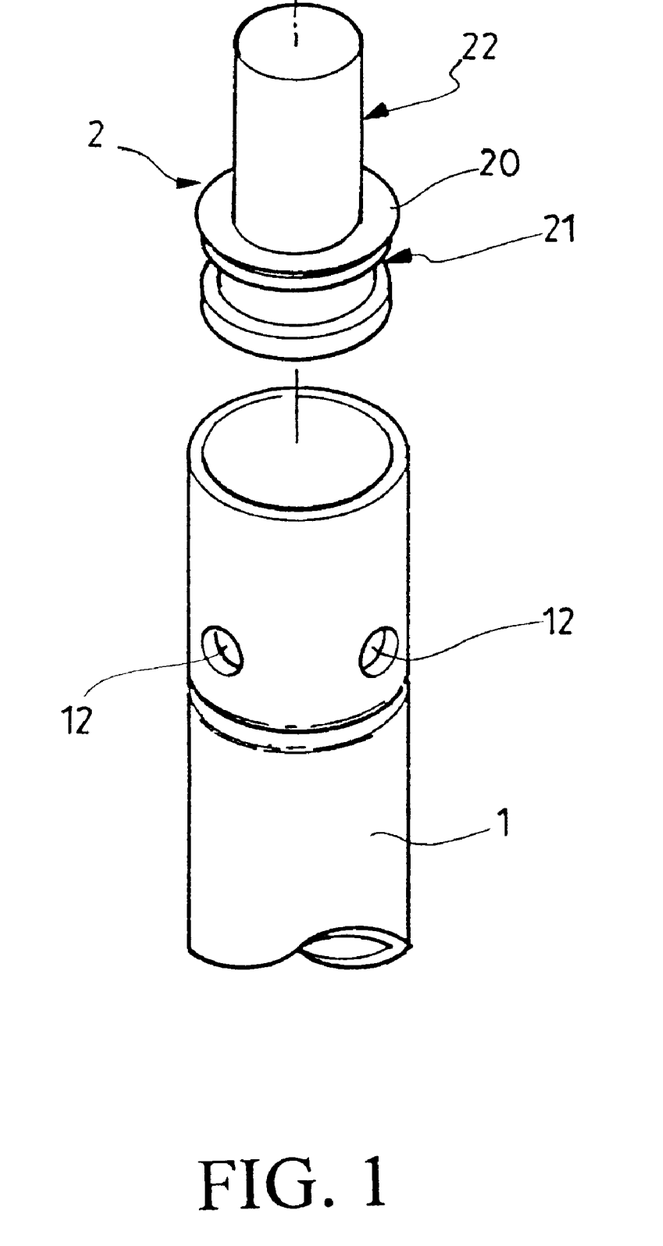
FIG. 1 is a perspective view of the coupling device made according to the present invention.
Figure 2:
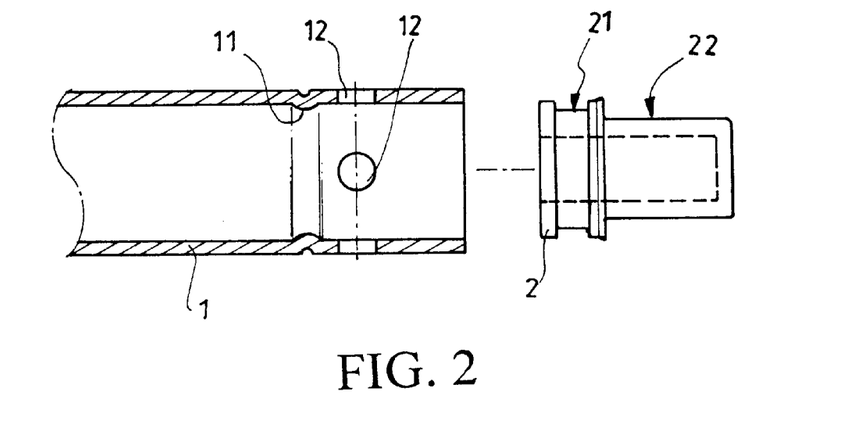
FIG. 2 is a cross sectional view showing the assembling of the tube and the insert.

Referring to FIGS. 1 and 2, the coupling device includes an insert 2 that can be positioned within the tube 1. The insert 2 includes an enlarged portion 20 that has annular groove 21 thereof, and a receiving space 22. The tube 1 is provided with a plurality of through holes 12 in the middle portion or end portions. The insert 2 can be positioned within the tube 1. The outer wall of the tube 1 is further machined to form an annular recess 11 that is corresponding to the annular groove 21 of the insert 2. By this arrangement, the insert 2 can be positioned within the tube 1 by the interference fit between the annular recess 11 and the annular groove 21.

Figure 3:
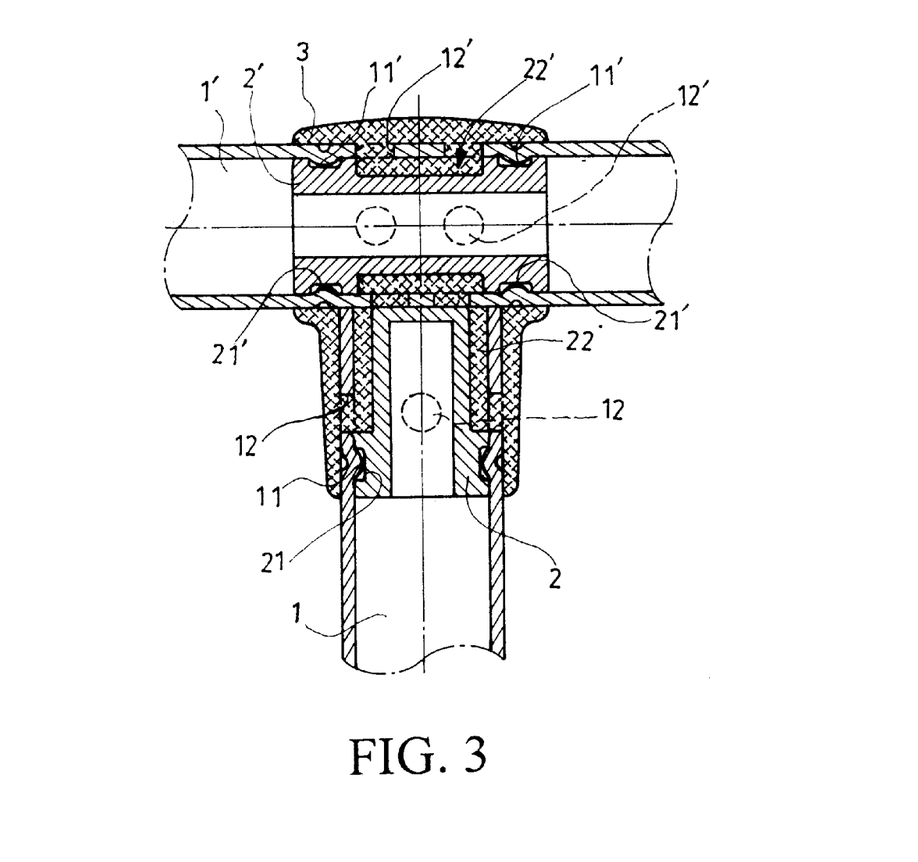
FIG. 3 is a cross section showing two tubes are connected in T-shape arrangement.

When the first tubes 1 and second tube 1' are provided with inserts 2, 2' and are arranged in T-shape arrangement, then an enclosing element 3 can be coated to the joint area to connect the first tube 1 and the second tube 1'.

By this arrangement, the insert 2 can be firstly positioned within the tube 1. Then the outer wall of the tube 1 is further machined to form an annular recess 11 thereof and that is corresponding to the annular groove 21 of the insert 2. By this arrangement, the insert 2 can be positioned within the tube 1 by the interference fit between the annular recess 11 and the annular groove 21.

Figure 4:
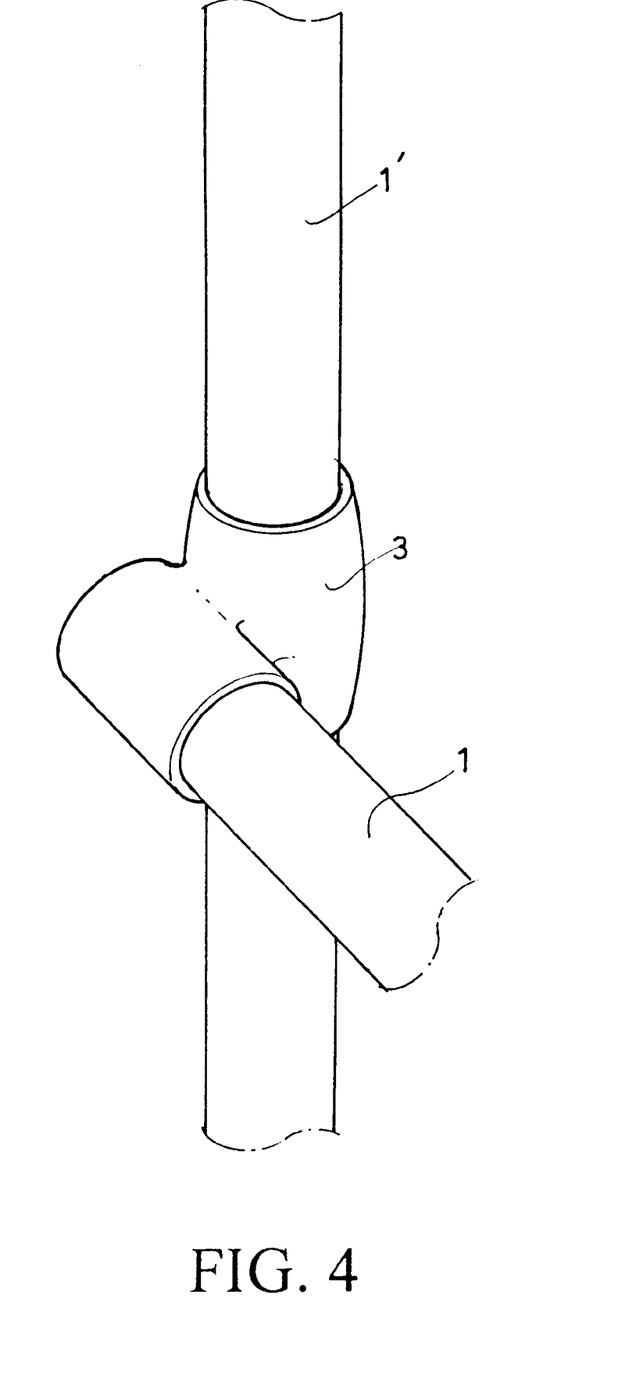
FIG. 4 is a first embodiment of the insert.

The enclosing element 3 on the joint between the connecting area of the first tube 1 and the second tube 1' is a viscous liquid when it is not cured. In this case, the viscous liquid may penetrate into the through holes 12, 12' of the tubes 1, 1' and fill- the receiving space 22, 22' of the insert 2, 2'. On the other hand, the enlarged portion 20 is dimensioned such that the inner space of the tube 1 can be blocked. As a result, the liquid enclosing element 3 will not flow to other end of the tube 1. By this arrangement, the liquid enclosing element 3 can be integrally connected with the inserts 2, 2'. As a result, the first and second tubes 1, 1' can be fixedly connected with each other. FIG. 3 shows a connection in T-shape arrangement, while FIG. 4 shows a connection in X-shape arrangement.

As can be seen in FIG. 3, the connecting element includes an exterior portion which extends around the outer wall of the tube 1, an interior portion which is located in the receiving space 22 of the insert 2 and is in contact with an inner wall of the tube 1, and portions which are located in the through holes 12 to connect the exterior and interior portions of the connecting element.

Figure 5:
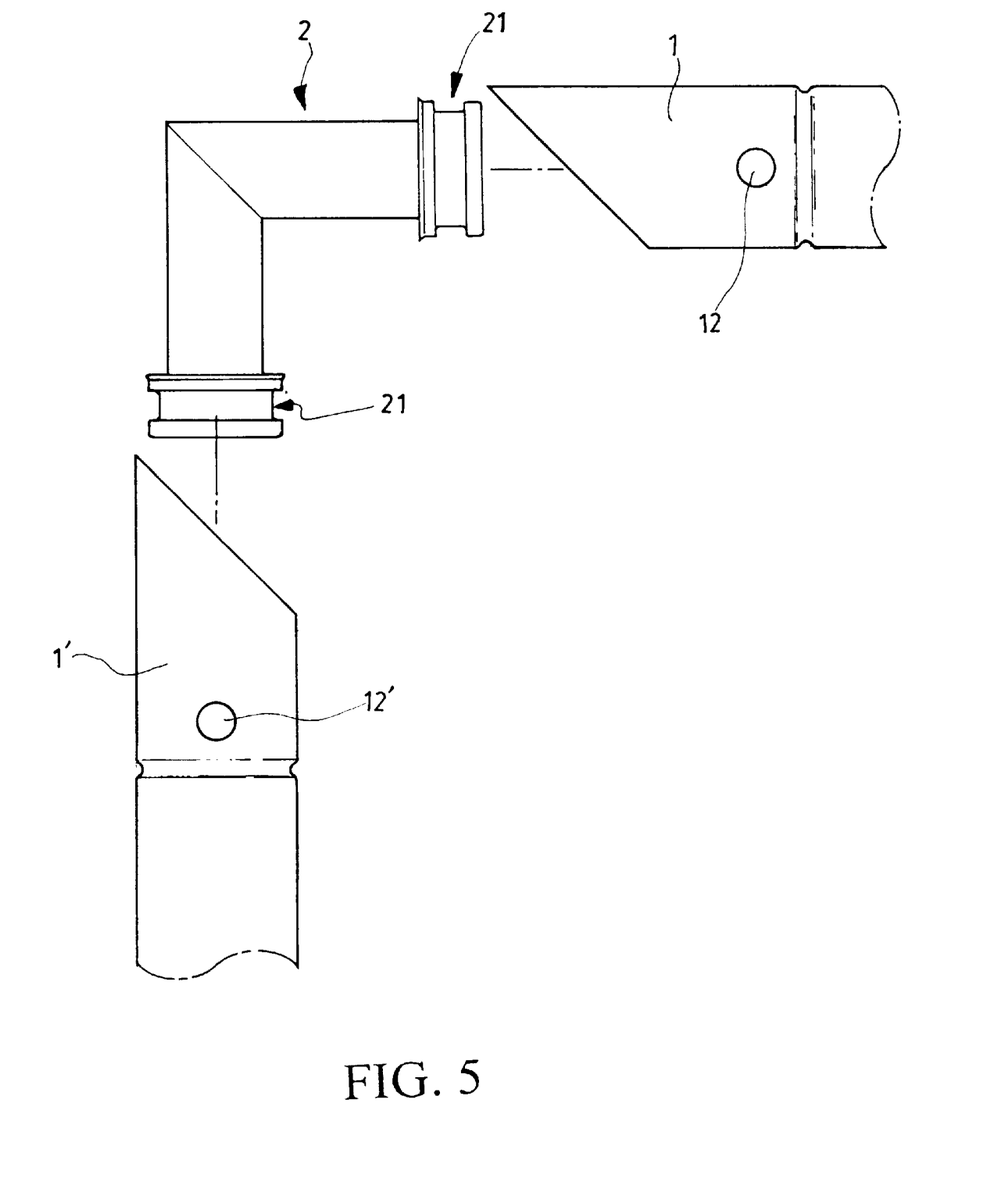
FIG. 5 is a second embodiment of the insert.
Figure 6:
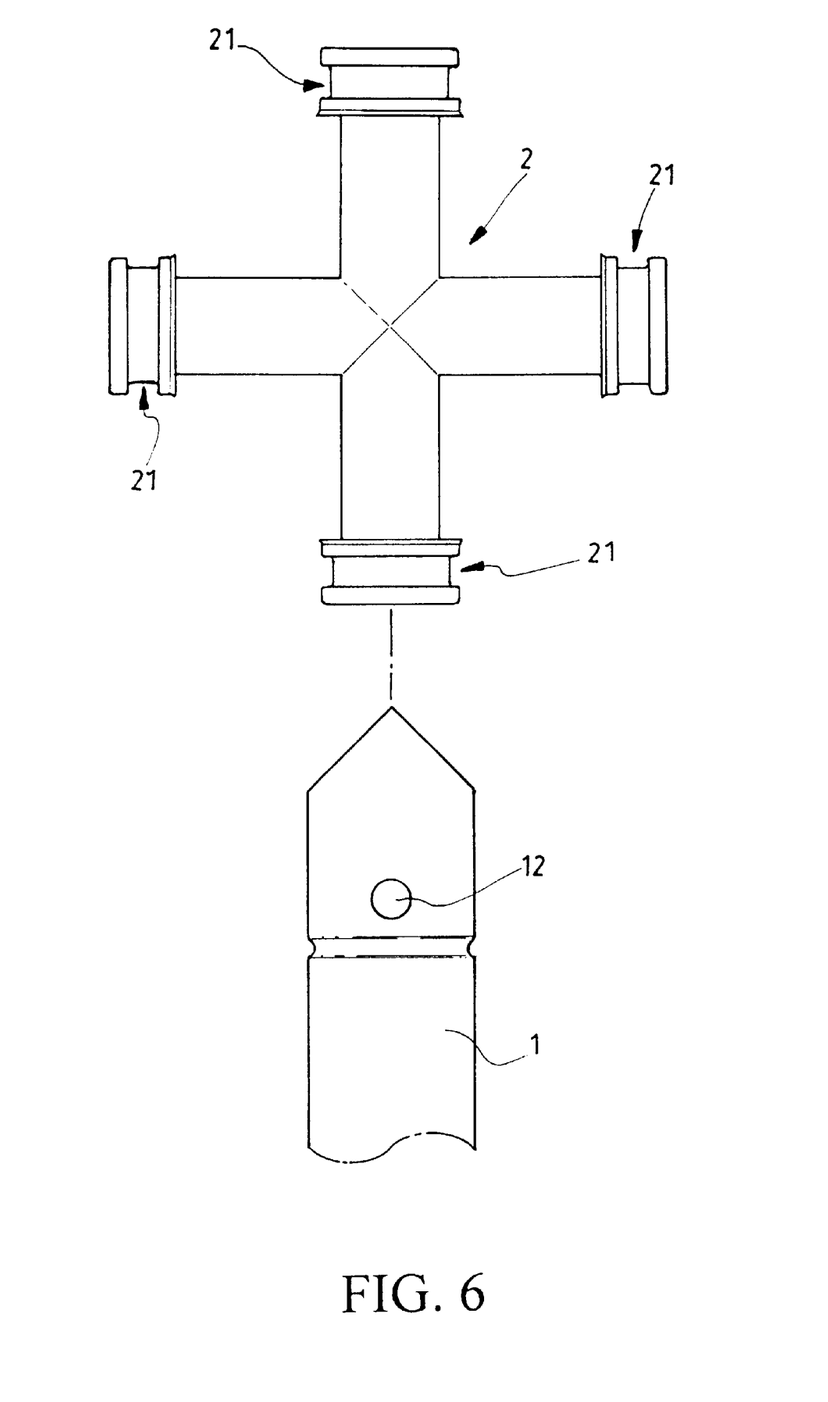
FIG. 6 is a third embodiment of the insert.
Figure 7:
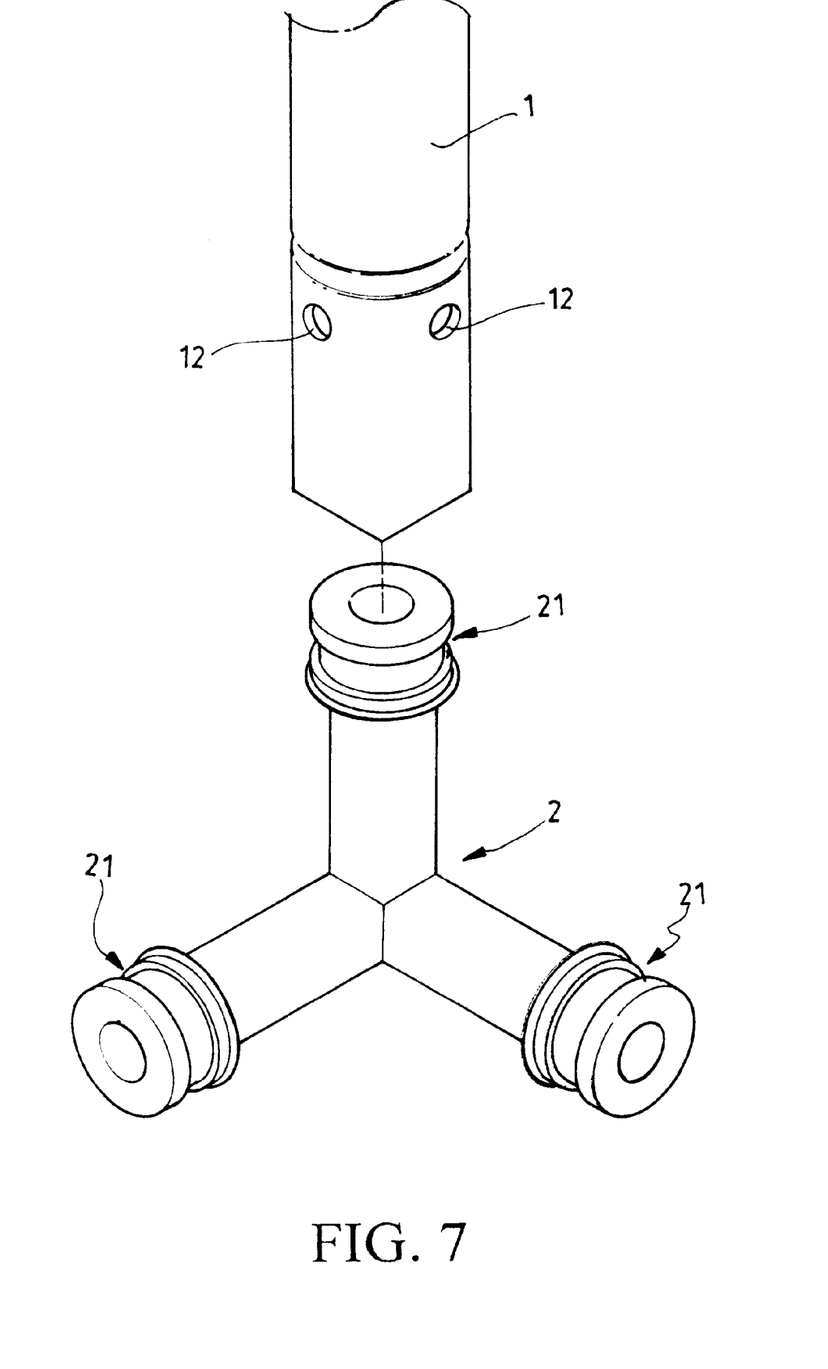
FIG. 7 is a fifth embodiment of the insert.

Referring to FIGS. 5, 6 and 6 coupling devices using the insert 2 can be arranged in L-shape, X-shape, and three-dimensional mutually perpendicular arrangement to meet different requirement. Each of the inserts 2 has an enlarged portion 20 that is provided with an annular groove 21. A receiving space 22 is further defined adjacent to the enlarged portion 20. As described above, the tube 1 can be readily enveloped onto the insert 2 from the enlarged portion 20. Then the enclosing element 3 can be deployed to fixedly connect the insert 2 and the tube 1. The insert 2 can be arranged in different shape to meet different requirement. By the provision of the insert 2, the tubes 1 can be assembled in many shape and configuration.

Furthermore, it is advantageous that the tubes 1, 1' can be undergone a heat treatment previously because the bulk size of the tube is quite small. The heat treatment can be readily performed. As the heating and cooling can be readily and effectively performed, the tube 1 can get a better heat treatment. As the cost of heat treatment is lowered, the manufacturing cost is lowered also. The marketing capability is also increased.

Since the heat treatment is performed before the tubes 1 are connected, no deformation will be experienced after the tubes 1 are connected. A better quality can be also attained.

The shape of the cross section of the tube 1 can be readily selected from round, square or another other suitable shape.

While particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

What is claimed is:

1. An improved coupling device for tubing, comprising a tube and an insert that is within said tube, said insert including an external receiving space and an enlarged portion having an annular groove therein, said tube being provided with a plurality of through holes, said tube being deformed to form an external annular recess corresponding to and positioned within said annular groove to fixedly retain said insert within said tube, a connecting element which is located to fixedly connect said tube and said insert, said connecting element including:

(a) an exterior portion which extends around an outer wall of said tube;
   (b) an interior portion which is located in said receiving space of said insert and is in contact with an inner wall of said tube; and
   (c) a connecting portion which is located in said through holes and connects said exterior and interior portions.

2. An improved coupling device according to claim 1 which includes two said inserts in combination with two said tubes which are connected together by said coupling device.

3. An improved coupling device according to claim 1 which includes two said inserts arranged in an L-shaped configuration.

4. An improved coupling device according to claim 1 which includes four said inserts arranged in an X-shaped configuration.

5. An improved coupling device according to claim 1 which includes three said inserts which are mutually perpendicular.

* * * * *